United States Patent Office 2,787,616
Patented Apr. 2, 1957

2,787,616

PREPARATION OF VERATRUM VIRIDE

Marvin R. Thompson, Riverside, Conn.

No Drawing. Application April 2, 1951,
Serial No. 218,913

4 Claims. (Cl. 260—236)

This invention relates to a hitherto unknown component of *Veratrum viride* and a process of preparing the same.

Attempts have been made to employ various Veratrum alkaloids such as veratridine, veratine, veratrone, jervine and its near relatives and crude extracts of Veratrum itself as hypotensive agents. In all such cases, the alleged depressor action has been depreciated by the presence of toxic principles, exerting in the main an antagonizing or pressor effect, which has restricted any widespread use of the drug as a hypotensive agent (see, for example, Studies of Veratrum Alkaloids by G. K. Moe and O. Krayer, J. Pharmacol. and Exp. Therap. 77:220, 1943).

Extensive investigations of the inventor have revealed the existence of that principle of the drug which is responsible for the depressor or hypotensive action without accompanying pressor or hypertensive effects and which is highly valuable as a hypotensive agent. Pharmacological studies with this new agent have determined that the agent produces an even, prolonged depressor effect without evidence of cardiac embarrassment whatsoever as shown by the kymograph recordings. This is in complete contrast with the hypotensive action of all known Veratrum alkaloids and extracts.

The potency of the new drug which I have named "Veranovine" is such that in pharmacological studies, it has a lethal dosage of 1 mg. per kilogram of body weight on guinea pigs and hamsters. Yet when administered in quantities as low as 0.1 mg. to an average individual, a sustained, uninhibited depressor action results usually extending over a 24-hour period without distress. This may be compared with increasing daily dosages of from 10 mg. on upward, with the most potent known Veratrum extracts.

The present invention provides a substance which differs from all other hitherto known Veratrum components in that it is a single chemical entity in the form of a definitely crystalline material which is considerably more soluble in water as the free base or its salts than the known Veratrum preparations. Moreover, as distinguished from the known substances, "Veranovine" may be given parenterally or orally without evidence of nausea or sickening and toxic after effects which inevitably accompany administration of the known Veratrum compositions.

The product is prepared from mascerated or powdered Veratrum by extraction of the crude material with aqueous alcoholic solution. The extraction is slightly more rapid in aqueous alcoholic solution and including suitable alcohols such as methyl, ethyl and isopropyl alcohols. If alcohol is used in the extraction, this is then separated from the aqueous extract by evaporation, for example, and the solution alkalized to a pH of from about 8 to 12, preferably with ammonium hydroxide, although sodium, potassium, lithium and other alkali metal hydroxides may be used. The alkaline solution of the drug is then extracted with an organic solvent such as ether, benzol, chloroform, and other water immiscible solvents and separated, leaving the pressor components in the aqueous portion. The solution of the drug in the organic solvent is then vigorously agitated with an acid aqueous solution at a pH of below the neutral point, but above 1.0 as the active drug is destroyed in more acid medium. Suitable acids for this purpose include hydrochloric, lactic, malic, maleic, acetic, succinic, tartaric, sulfuric and the like. Preferably the two solutions are agitated by shaking in the presence of an acid solution having a pH of 5.0 or below, thereby causing the desired active substance to transgress into the aqueous layer in the form of the acid salt. The pH of the aqueous layer is then raised with any suitable alkali material as indicated above to reach a value of from about 8.0 to about 12.0 causing the active depressor substance to precipitate as the base.

The precipitate in the from of a base may then be purified by dissolving in organic solvent such as ether and filtering the ethereal solution to remove any traces of water. The active drug in ether is then treated with dry hydrochloric or other acid gas or completely dry acid crystals such as tartaric acid. This causes crystallization of the active drug from the ether solution in the form of a salt which is readily water soluble.

Depending upon the particular acid employed, the drug may be recovered and employed as water soluble salt of any of the well-known nontoxic acids.

*Example*

One kilogram of *Veratrum viride* is extracted with 5 liters of water until the water soluble principles are substantially exhausted. This aqueous solution is then treated with ammonium hydroxide to pH 9. The alkaline, aqueous solution is then agitated with an equal volume of diethyl ether and the aqueous layer separated from the organic solvent. This procedure may be repeated four times with fresh volumes of ether for maximum yield. The ether fractions are then combined and agitated with an equal volume of water acidified to a pH of 5.0 with tartaric acid and the acid layer then containing the active drug is separated from the organic solvent. Sufficient ammonium hydroxide is again added to the acid aqueous solution to raise the pH to about 9.0, causing the transfer of the active drug as the free base into the ethereal layer. This may be further purified by filtering the ethereal solution through dry filter paper to remove traces of water and then agitating the ether solution in the presence of dry hydrochloric gas which crystallizes the highly purified drug in the form of the hydrochloride.

When purified by recrystallization, "Veranovine" appears in the form of individual crystals of triangular appearance for the most part, tending to cluster in the form of rosettes. In the form of hydrochloride when subjected to melting point determinations, it sinters at 190° C. and melts between 190 and 200° C., a substantially pure sample melting at about 195° C.

I claim:

1. A process for obtaining an active depressor substance from *Veratrum viride* which comprises extracting the crude drug in aqueous solution, alkalizing the aqueous extract to a pH of from about 8 to 12 and extracting the wetted alkaline drug with an organic solvent, separating the aqueous fraction and agitating the solution of the drug in the organic solvent with acid aqueous solution at a pH of from 1 to 7 to cause the active substance to pass into the aqueous component and alkalizing the aqueous component to a pH of from about 8 to 12 to precipitate the desired depressor substance.

2. The process of claim 1 wherein the initial aqueous extract is alkalized to a pH from 8 to 10 and the drug is extracted from the organic solvent with an acid aqueous solution at a pH of from 2 to 6.

3. The process of claim 1 where the organic solvent is ether.

4. A process for obtaining an active depressor substance from *Veratrum viride* which comprises extracting the crude drug in aqueous solution, alkalizing the aqueous extract to a pH of from about 8 to 12, extracting the aqueous solution with an organic solvent and agitating the solution of the drug in the organic solvent with an acid aqueous solution at a pH of from 2 to 6, to cause the active substance to pass into the aqueous component and alkalizing the aqueous component to a pH of from about 8 to 12 to precipitate the active drug as the base, redissolving the substance in an organic solvent and crystallizing the active drug with a dry acid.

References Cited in the file of this patent

Grant et al.: J. Am. Pharm. Assoc., vol. 41, pp. 309–311 (1952).

Jacobs et al.: J. Biol. Chem., vol. 160, pp. 555–565 (1945).

Fried et al.: J. Am. Chem. Soc., vol. 72, pp. 4621–4630 (1950).